United States Patent
Han

(10) Patent No.: US 11,276,136 B2
(45) Date of Patent: Mar. 15, 2022

(54) EXTERNAL GRAPHICS SYSTEM AND EXTERNAL GRAPHICS METHOD

(71) Applicant: Tai-Sheng Han, New Taipei (TW)

(72) Inventor: Tai-Sheng Han, New Taipei (TW)

(73) Assignee: EVGA CORPORATION, New Taipei (TW)

(*) Notice: Subject to any disclaimer, the term of this patent is extended or adjusted under 35 U.S.C. 154(b) by 0 days.

(21) Appl. No.: 16/987,129

(22) Filed: Aug. 6, 2020

(65) Prior Publication Data
US 2022/0044348 A1 Feb. 10, 2022

(51) Int. Cl.
*G06F 15/16* (2006.01)
*G06T 1/20* (2006.01)
*G09G 5/36* (2006.01)

(52) U.S. Cl.
CPC .............. *G06T 1/20* (2013.01); *G09G 5/363* (2013.01); *G09G 2352/00* (2013.01); *G09G 2360/06* (2013.01); *G09G 2360/08* (2013.01); *G09G 2370/00* (2013.01)

(58) Field of Classification Search
CPC ....... G06T 1/20; G06F 1/1632; G06F 13/102; G06F 13/122; G06F 13/387; G06F 21/85; G06F 3/14; G09G 2360/06; G09G 5/363; G09G 2370/10; G09G 2370/12
See application file for complete search history.

(56) References Cited

U.S. PATENT DOCUMENTS

| | | | |
|---|---|---|---|
| 2016/0134907 A1* | 5/2016 | Wolman | H04N 21/6181 725/116 |
| 2019/0102334 A1* | 4/2019 | Berchanskiy | G06F 13/4027 |
| 2019/0392548 A1* | 12/2019 | Nakata | G06F 13/20 |

* cited by examiner

*Primary Examiner* — Hau H Nguyen
(74) *Attorney, Agent, or Firm* — Che-Yang Chen; Law Office of Michael Chen

(57) ABSTRACT

An external graphics method for an external graphics system is provided. The external graphics system includes a host device at least having a first graphics processing unit that generates a first video stream signal, and an external graphics device for connecting to the host device. The external graphics device at least includes a second graphics processing unit that generates a second video stream signal, and a TBT interface unit electrically connected to the host device. The method mainly includes: when the host device determining a graphics processing performed by the second graphics processing unit not exceeding a load-carrying capacity threshold, displaying an image frame corresponding to a TBT signal; and when determining the graphics processing performed by the second graphics processing unit exceeding the load-carrying capacity threshold, computing the TBT signal and the first video stream signal in sum, and displaying the corresponding image frame accordingly.

8 Claims, 5 Drawing Sheets

EXTERNAL GRAPHICS SYSTEM AND EXTERNAL GRAPHICS METHOD

BACKGROUND OF THE INVENTION

Field of Invention

The present invention relates to the technical field of external discrete graphics card, and more particularly to an external graphics system and an external graphics method using TBT connection technology.

Related Art

With the advancement of technology, the functions of computers tend to be diversified, and various peripheral devices are constantly being innovated. Most existing notebook computers are equipped with a graphics processing chip, which can perform computation on 3D image data with a large amount of data. In order to facilitate users to improve computer performance or expand computer functions, desktop computers can usually be implemented by inserting a graphics card, but because the notebook computer is an integral package structure, it is impossible to directly insert a graphics card like a desktop computer, usually the graphics processing function is expanded by means of externally connected modules. With the advancement of data transmission technology, high-speed data transmission protocols have also been introduced. Thunderbolt transmission interface (hereinafter referred to as Thunderbolt) has the function of high-speed data transmission, so the current computing devices with a Thunderbolt port are compatible with Thunderbolt transmission protocol to communicate with an external device that also has a Thunderbolt port.

For the purpose of streamlining the current computer architecture, an integrated graphics processing unit (GPU) is built into the central processing unit (CPU) or motherboard to assist the central processing unit to perform graphics computation, which applied to both desktop computers and laptops. However, for applications that require a large amount of graphics computation such as 3D games, high-definition movies, animations, etc., the computing performance of the central processing unit or the built-in integrated graphics processing unit is still insufficient, so it is necessary to additionally configure a discrete graphics processing unit with higher computing performance to assist the computation. For example, for the desktop computer, a discrete graphics processing unit in the form of an interface card is inserted on the bus of the computer motherboard to perform the graphics computing tasks delivered by the central processing unit; or, for the notebook computer, graphics processing capability can be expanded by means of an externally connected display module, such as an additional Thunderbolt graphics card external enclosure, and after the user completes installation of Thunderbolt driver and firmware on the computer, the computer can successfully recognize the external device and determine that it is an external graphics card (external GPU) to further improve the graphics computing capability of the computer.

In order to replace the original graphics performance of notebook computers, currently the Thunderbolt graphics card external enclosure additionally provided in the form of an interface card is commonly used for externally connecting to notebook computers, so that users can upgrade the graphics computing capability through the Thunderbolt graphics card external enclosure. However, the existing Thunderbolt graphics card external enclosures are applied to replace the graphics processing unit built in the notebook computer. Due to the optimized processing principle of computer, and automatically adding of power saving considerations and interface bandwidth limitations, only the path to optimize the computing performance of computer will be found to meet the user's demand for graphics performance. The notebook computer will automatically ignore the video stream computed by the graphics processing unit built in the notebook computer, and only use the video stream from the Thunderbolt graphics card external enclosure, which is like a waste of graphics computing performance of the graphics processing unit built in the notebook computer.

SUMMARY OF THE INVENTION

In view of the foregoing technical drawbacks, the present invention discloses an external graphics system that uses a Thunderbolt transmission interface to enable a computer to add an additional graphics processing unit for graphics processing, and a graphics processing unit built in a notebook computer is also capable of performing graphics processing jointly.

The present invention also discloses an external graphics method capable of operating a graphics processing unit built in a notebook computer and a Thunderbolt graphics card external enclosure jointly through a software to further improve an overall graphics computing performance, and controlling a load-carrying capacity of an image frame to be displayed below a maximum load-carrying capacity value, and also optimizing graphics performance for images.

The external graphics system provided by the present invention includes a host device at least having a first graphics processing unit and a central processing unit, and an external graphics device for connecting to the host device. The central processing unit issues a first request command and/or a second request command to execute a graphics processing. The first graphics processing unit receives the first request command sent by the central processing unit to perform the graphics processing accordingly to generate a first video stream signal. The external graphics device at least includes: a TBT interface unit electrically connected to the host device; and a second graphics processing unit electrically connected to the TBT interface unit, the second request command sent by the central processing unit is received through the TBT interface unit, the graphics processing is performed accordingly to generate a second video stream signal, the second video stream signal is converted into a TBT signal, and the TBT signal is transmitted to the host device through the TBT interface unit. The central processing unit determines whether the graphics processing of the second graphics processing unit exceeds a load-carrying capacity threshold based on the second request command, when the graphics processing of the second graphics processing unit does not exceed the load-carrying capacity threshold, the first graphics processing unit does not operate, and the host device displays an image frame corresponding to the TBT signal; when the graphics processing of the second graphics processing unit exceeds the load-carrying capacity threshold, the central processing unit redistributes the second request command and the first request command, and integrates the TBT signal and the first video stream signal to obtain a third video stream signal, and the host device displays an image frame corresponding to the third video stream signal.

According to one embodiment of the present invention, the host device further includes a display unit, the display unit includes a receiving module, and the receiving module receives the first video stream signal, and/or the TBT signal, or the third video stream signal.

According to one embodiment of the present invention, the load-carrying capacity threshold is an energy efficiency upper limit value of the graphics processing performed by the second graphics processing unit.

According to one embodiment of the present invention, the host device further includes a host-end interface unit, and the TBT interface unit is electrically connected to the host-end interface unit of the host device through a TBT transmission line.

According to one embodiment of the present invention, the central processing unit is loaded with an operating system, the operating system is at least installed with a graphics driver, and the graphics driver is used to drive the first graphics processing unit and/or the second graphics processing unit.

According to one embodiment of the present invention, the first video stream signal integrated with the third video stream signal is formed by the first graphics processing unit performing the graphics processing on a video traffic that exceeds the load-carrying capacity threshold.

Furthermore, the external graphics method provided by the present invention utilizes an external graphics system to enhance graphics performance. The external graphics system includes a host device at least having a first graphics processing unit and a central processing unit, and an external graphics device used to connect to the host device. The external graphics device at least includes a second graphics processing unit and a TBT interface unit. The central processing unit is used to issue a first request command to instruct the first graphics processing unit to perform a graphics processing, and/or a second request command to instruct the second graphics processing unit to perform the graphics processing. The external graphics method includes: the central processing unit determining whether the graphics processing of the second graphics processing unit exceeding a load-carrying capacity threshold based on the second request command; when the graphics processing of the second graphics processing unit not exceeding the load-carrying capacity threshold, the second graphics processing unit receiving the second request command through the TBT interface unit and performing the graphics processing accordingly to generate a second video stream signal, and converting the second video stream signal into a TBT signal, transmitting the TBT signal to the host device through the TBT interface unit, and the host device displaying an image frame corresponding to the TBT signal. When the graphics processing of the second graphics processing unit exceeding the load-carrying capacity threshold, the central processing unit redistributing the second request command and the first request command, the first graphics processing unit receiving the allocated first request command and performing the graphics processing accordingly to generate a first video stream signal; the second graphics processing unit receiving the allocated second request command through the TBT interface unit and performing the graphics processing accordingly to generate the TBT signal corresponding to the second video stream signal, the central processing unit integrating the TBT signal and the first video stream signal to obtain a third video stream signal, and the host device displaying an image frame corresponding to the third video stream signal.

According to one embodiment of the present invention, the host device further includes a display unit, the display unit is used to display the image frame corresponding to the TBT signal and/or the first video stream signal, or to display the image frame corresponding to the third video stream signal.

According to one embodiment of the present invention, when the graphics processing of the second graphics processing unit exceeds the load-carrying capacity threshold, the central processing unit redistributes the first request command based on a video traffic exceeding the load-carrying capacity threshold; the first video stream signal integrated with the third video stream signal is formed by the first graphics processing unit performing the graphics processing according to the video traffic indicated by the first request command.

DETAILED DESCRIPTION OF THE INVENTION

In order to facilitate the description of the central idea in the above summary of the present invention, it is expressed in specific embodiments below. Various objects in the embodiments are depicted in proportions, sizes, deformations, or displacements that are suitable for the description, rather than in proportion to actual components.

The singular forms "a", "one" and "the" used herein also comprise the plural forms unless the context clearly indicates otherwise. Furthermore, it should be understood that when being used in this specification, the terms "include" and/or "comprise" specify the presence of the described features, elements and/or components, but do not exclude the presence or addition of one or a plurality of other features, elements and/or components. In addition, it should be understood that although the terms first, second, or third, etc. can be used herein to describe each element, component, or area, such terms should not limit the elements, components, or areas. The terms are only used to distinguish one element, component, or area from another element, component, or area.

Figure 1:
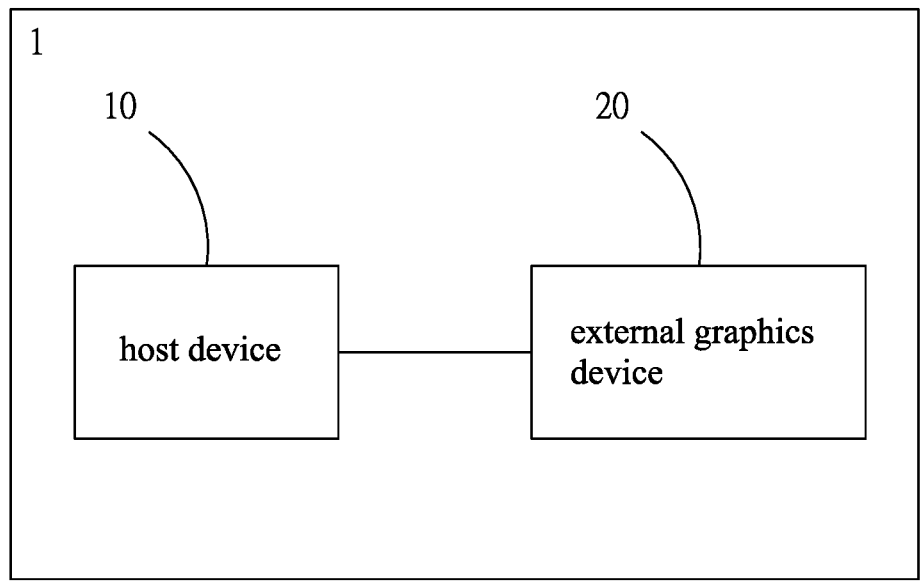
FIG. 1 is an overall block diagram of an external graphics system according to one preferred embodiment of the present invention.

Firstly, please refer to FIG. 1, which shows an overall block diagram of an external graphics system of the present invention. As shown in FIG. 1, an external graphics system 1 of the present invention includes a host device 10 and an external graphics device 20 for connecting to the host device 10. The host device 10 can be, for example, a notebook computer; the external graphics device 20 can be, for example, a Thunderbolt graphics card external enclosure connected to the notebook computer, which is mainly electrically connected to the host device 10 through a TBT transmission line (not shown in the figure).

Figure 2A:
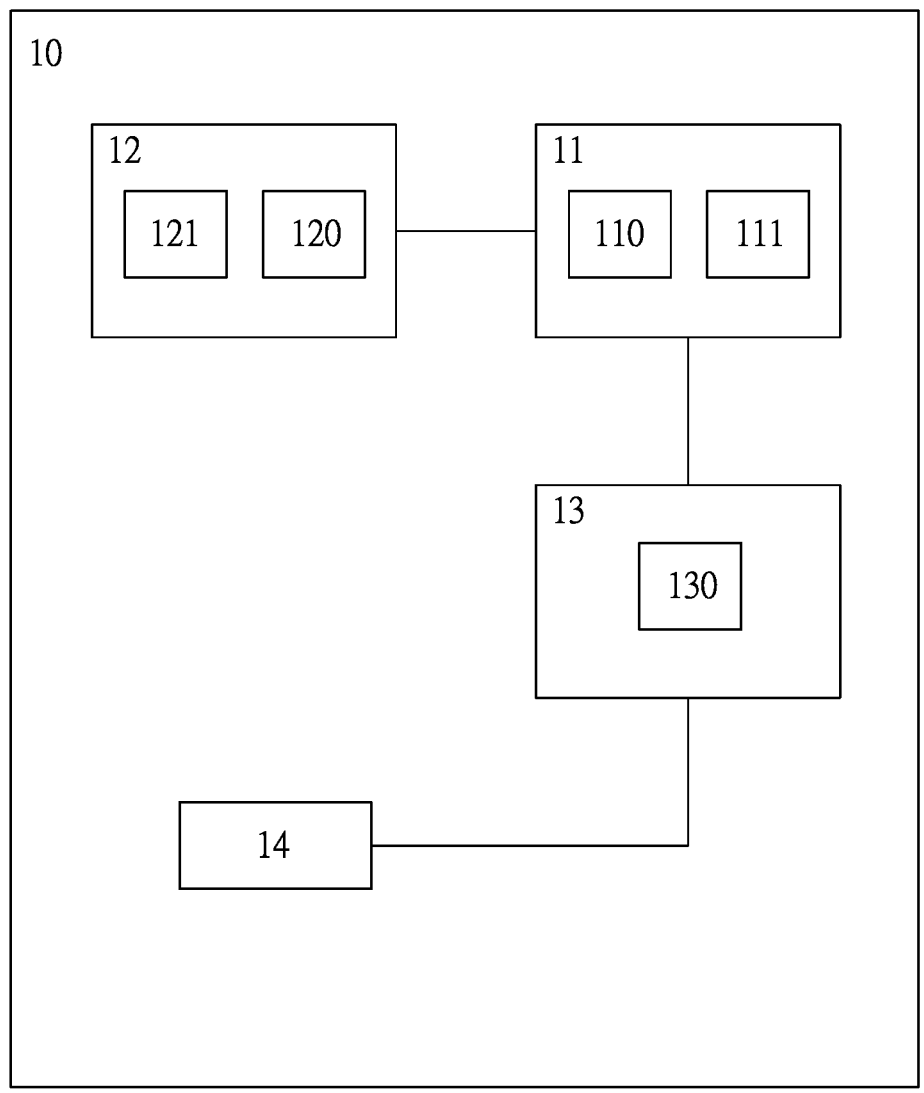
FIG. 2A is a detailed block diagram of a host device of the external graphics system according to one preferred embodiment of the present invention.

Then, please refer to FIG. 2A, which shows a detailed block diagram of the host device of the external graphics system. As shown in FIG. 2A, the host device 10 at least includes a first graphics processing unit 11, a display unit 12, a central processing unit 13, and a host-end interface unit 14. For example, in one preferred embodiment, the host device 10 can be a notebook computer, the first graphics processing unit 11 can be a graphics card or a graphics chip built in the notebook computer itself, the display unit 12 can be a screen of the notebook computer, and the central processing unit 13 can be a central processor of the notebook computer. The display unit 12 generally at least has a receiving module 120 and a coupled display module 121, a video stream signal that has been graphically processed is received from the first graphics processing unit 11, and the display module 121 displays a corresponding image frame.

The first graphics processing unit 11 is electrically connected to the display unit 12 and the central processing unit 13 respectively. The first graphics processing unit 11 at least has an output module 110 and an image processing circuit 111. The output module 110 sends a first video stream signal generated by the image processing circuit 111 to the display unit 12. The display unit 12 uses the receiving module 120 to receive the first video stream signal, and uses the display module 121 to display an image frame corresponding to the first video stream signal. Both the output module 110 of the first graphics processing unit 11 and the receiving module 120 of the display unit 12 can comprise at least one of video graphics array (VGA) interface (such as D-SUB interface), digital video interface (DVI), Thunderbolt, low voltage differential signaling (LVDS), and high definition multimedia interface (HDMI).

The central processing unit 13 at least has an operating system 130 with a graphics driver installed. The operating graphics driver converts graphics requests (a user's operation behaviors such as inputting text, switching work windows, etc.) generated by the operating system 130; or displayed texts, computer-generated icons, or graphical user interface, etc. generated in response to an execution result (such as pop-up dialog boxes or confirmation options, etc.) of an application program into graphics request commands such as GDI commands, QuickDraw commands, GDK commands, or Xlib commands, etc. corresponding to a type of the operating system 130. When the host device 10 intends to display on the display unit 12 a screen that includes or consists essentially of graphical user interface data, computer image data, or text data, the central processing unit 13 only needs to convert the graphics requests sent by the operating system 130 into the graphics request commands and transmit the graphics request commands to a graphics processing unit such as a graphics card, a graphics chip and/or a Thunderbolt graphics card external enclosure to perform graphics processing tasks, without consuming computing resources of the central processing unit 13 to generate video stream signals. The graphics request commands mentioned herein comprise a first request command and a second request command described below.

In one preferred embodiment, the graphics processing tasks include video processing tasks and graphics computing tasks. The first graphics processing unit 11 transmits processing results of the graphics processing tasks to the display unit 12 to enhance a graphics-drawing computing capability of the display unit 12 to perform the video processing tasks, or enhance a graphics computing capability of the display unit 12 to perform the graphics computing tasks. The video processing tasks to be performed can be video processing of 2D or 3D graphics rendering, or image acceleration processing, especially in response to the demands of 3D drawing or 3D game software, but are not limited thereto. The graphics computing tasks to be performed can be enabling the first graphics processing unit 11 to perform general arithmetic processing including 2D or 3D graphics in a GPGPU (General-Purpose Computing on GPU) mode. Commands and data required to perform the general arithmetic processing accordingly can be transferred from the graphics driver of the central processing unit 13 of the host device 10 to the first graphics processing unit 11 (that is, to transfer the first request command to the first graphics processing unit 11). Computed arithmetic results are equivalent to an energy efficiency of graphics processing that the first graphics processing unit 11 is capable of performing, and is generally represented by an amount of computation, and this first amount of computation will be transmitted back to the graphics driver of the central processing unit 13 in the mode of the first video stream signal. In particular, the first video stream signal can represent the first amount of computation, and can also represent a result of the video processing tasks correspondingly performed by the first graphics processing unit 11.

Figure 2B:
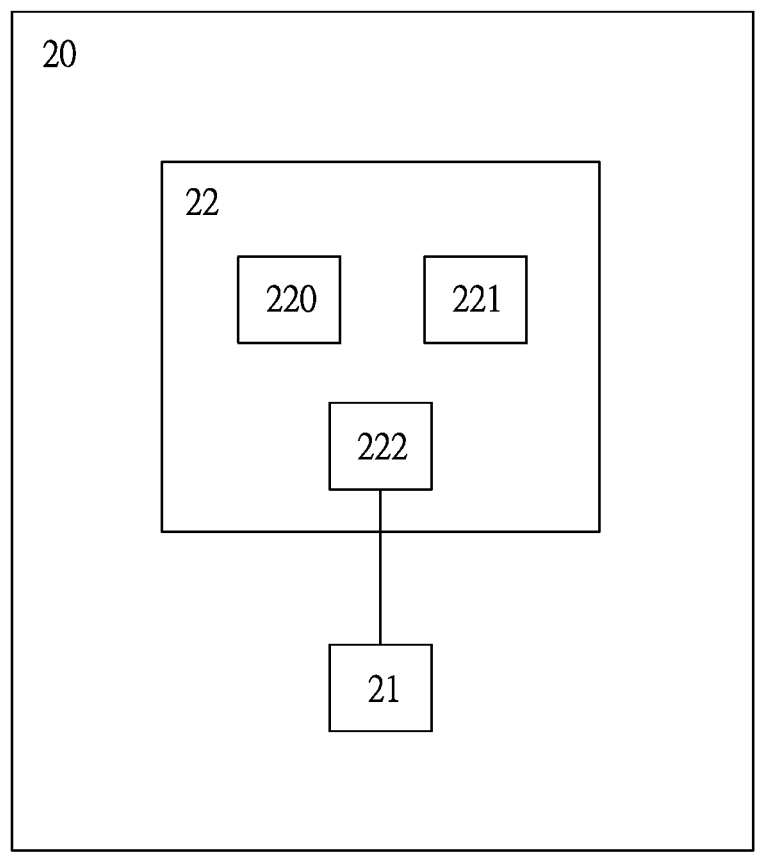
FIG. 2B is a detailed block diagram of an external graphics device of the external graphics system according to one preferred embodiment of the present invention.
Figure 3:
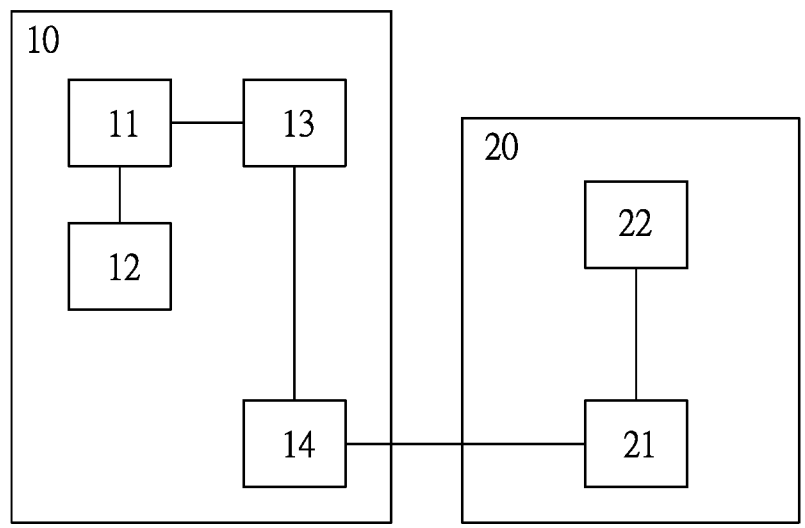
FIG. 3 is a block diagram of the connection of components of the external graphics system according to one preferred embodiment of the present invention.

Then, please refer to FIGS. 2B and 3. FIG. 2B shows a detailed block diagram of the external graphics device of the external graphics system; and FIG. 3 shows a block diagram of the connection of components of the external graphics system. In one preferred embodiment, as shown in FIGS. 2B and 3, the external graphics device 20 at least includes a TBT interface unit 21 and a second graphics processing unit 22. The TBT interface unit 21 is used to electrically connect to the host-end interface unit 14 of the host device 10 via the TBT transmission line, so that transmission of the graphics request commands and signals can be realized between the host-end interface unit 14 and the TBT interface unit 21. The host-end interface unit 14 is a TBT interface. The second graphics processing unit 22 can be, for example, a graphics chip or a graphics card, which is electrically connected to the TBT interface unit 21, and receives the second request command transmitted by the central processing unit 13 through the host-end interface unit 14 via the TBT interface unit 21, and performs the graphics processing tasks accordingly. The second graphics processing unit 22 at least includes a video processing module 220, a TBT conversion module 222, and a computing execution module 221. The video processing module 220 performs the video processing tasks to generate a second video stream signal, and the TBT conversion module 222 converts the second video stream signal into a TBT signal. The TBT signal is transmitted to the host-end interface unit 14 through the TBT interface unit 21, and then transmitted to the display unit 12 via the central processing unit 13 and the first graphics processing unit 11 sequentially. The computing execution module 221 performs the graphics computing tasks, that is, computing an energy efficiency of graphics processing that the second graphics processing unit 22 is capable of performing, which is represented by a second amount of computation, and the second amount of computation is transmitted in the form of the second video stream signal to the graphics driver of the central processing unit 13 via the host-end interface unit 14. In particular, the second video stream signal can represent the second amount of computation, and can also represent a result of the video processing tasks correspondingly performed by the second graphics processing unit 22.

The graphics driver installed in the operating system 130 determines whether the energy efficiency (hereinafter referred to as the second amount of computation) of graphics processing that the second graphics processing unit 22 is capable of performing after receiving the second request command exceeds a load-carrying capacity threshold based on the second request command sent to the second graphics processing unit 22. The load-carrying capacity threshold can be an important parameter built into the graphics driver, and represents an energy efficiency upper limit value of graphics processing that the second graphics processing unit 22 is capable of performing. When the external graphics device 20 is connected to the host-end interface unit 14 using the TBT transmission line, through the host-end interface unit 14 the host device 10 is electrically connected to the TBT transmission line that is connected to the TBT interface unit 21 in the external graphics device 20 in order to receive the TBT signal. When the graphics driver determines that the second amount of computation does not exceed the load-carrying capacity threshold, the graphics driver drives the receiving module 120 of the display unit 12 to receive the TBT signal. Since the second amount of computation does not exceed the load-carrying capacity threshold, the first graphics processing unit 11 does not operate, so the display module 121 of the display unit 12 displays an image frame of the TBT signal alone.

When the graphics driver determines that the second amount of computation exceeds the load-carrying capacity threshold, a portion of the second amount of computation exceeding the load-carrying capacity threshold is computed by the first graphics processing unit 11 of the host device 10, while a portion of the second amount of computation not exceeding the load-carrying capacity threshold is computed by the second graphics processing unit 22 of the external graphics device 20. Then, the graphics driver redistributes the second request command and the first request command, the allocated second request command can be regarded as the energy efficiency upper limit of graphics processing that the second graphics processing unit 22 is instructed to perform, and the allocated first request command can be regarded as a graphics processing (hereinafter referred to as compensated graphics processing tasks) corresponding to a video traffic exceeding the load-carrying capacity threshold that the first graphics processing unit 11 is instructed to perform. Therefore, the graphics driver issues the allocated first request command to the first graphics processing unit 11 to drive the first graphics processing unit 11 to perform the compensated graphics processing tasks (including the video processing tasks and the graphics computing tasks) to generate the first video stream signal. In addition, the graphics driver issues the allocated second request command to the second graphics processing unit 22 to drive the second graphics processing unit 22 to perform the graphics processing tasks to generate the second video stream signal, and converts the second video stream signal into the TBT signal. After the graphics driver receives the first video stream signal and the TBT signal through the host-end interface unit 14 connected to the TBT transmission line of the TBT interface unit 21, the first video stream signal and the TBT signal are integrated into the form of a third video stream signal, and the third video stream signal can represent a result of computing the first video stream signal and the TBT signal in sum. The graphics driver drives the first graphics processing unit 11 to output the third video stream signal to the display unit 12, and the display module 121 displays an image frame corresponding to the third video stream signal.

Figure 4:
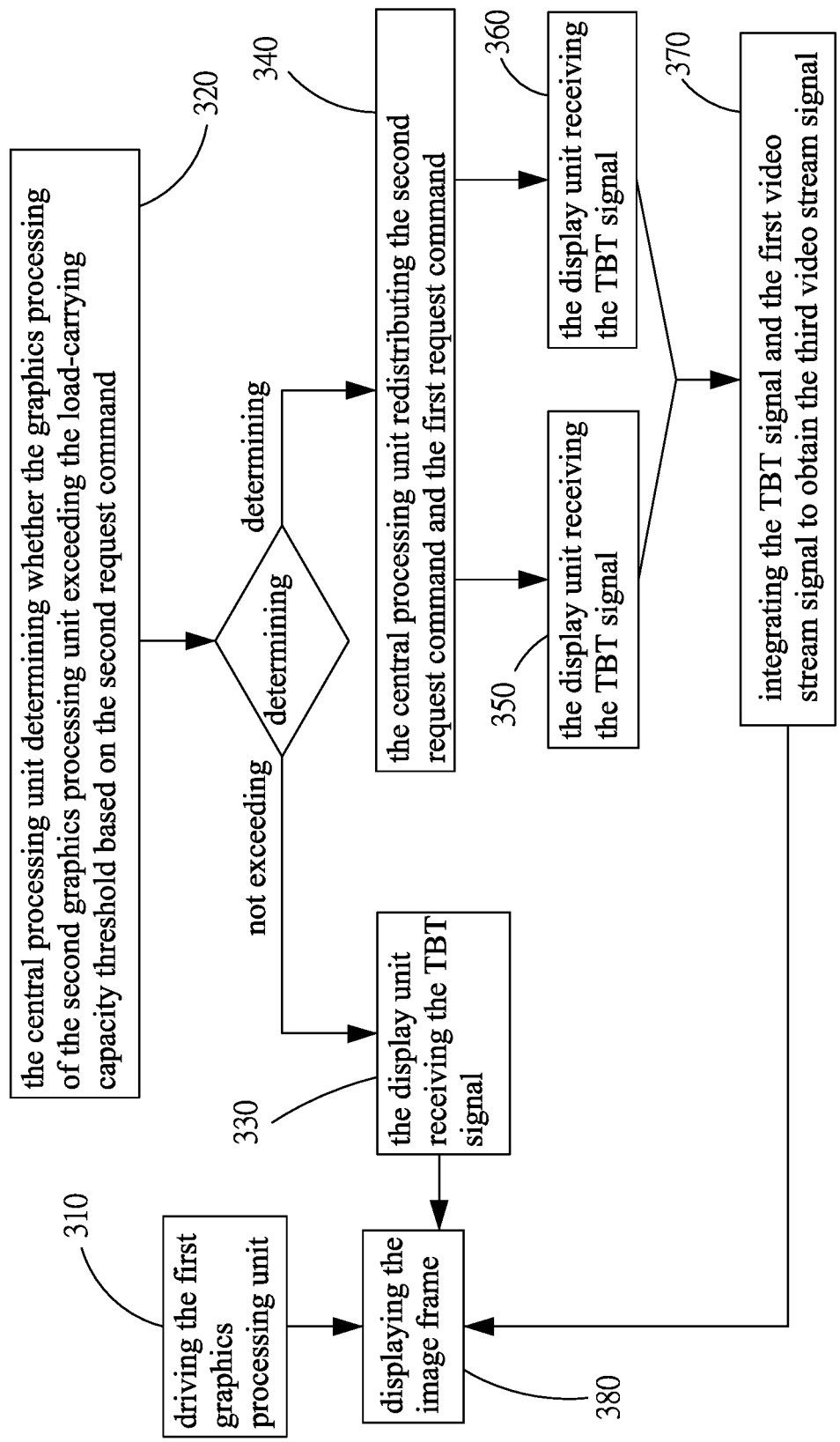
FIG. 4 is a flowchart of an external graphics method according to one preferred embodiment of the present invention.

A flowchart of practical application of the external graphics method of the present invention will be described below using FIG. 4 as an example. As shown in FIG. 4, a process 300 depicts one preferred embodiment of the external graphics method of the present invention.

In step 310, driving the first graphics processing unit 11. The graphics driver installed in the operating system 130 of the central processing unit 13 issuing the first request command to drive the first graphics processing unit 11 to perform the graphics processing tasks, the image processing circuit 111 generating the first video stream signal, and the output module 110 sending the first video stream signal to the display unit 12. Then, the display unit 12 executing step 380: the display module 121 displaying the received image frame corresponding to the first video stream signal.

In step 320, the central processing unit 13 determining whether the graphics processing of the second graphics processing unit 22 exceeding the load-carrying capacity threshold based on the second request command. When the TBT interface unit 21 of the external graphics device 20 and the host-end interface unit 14 of the host device 10 being electrically connected by the TBT transmission line, the graphics driver installed in the operating system 130 of the central processing unit 13 determining whether the graphics processing performed by the second graphics processing unit 22 exceeding the load-carrying capacity threshold based on the second request command sent to the second graphics processing unit 22, that being, determining whether the estimated second amount of computation exceeding the load-carrying capacity threshold.

When determining not exceeding the load-carrying capacity threshold, performing step 330, the graphics driver driving the display unit 12 to receive the TBT signal, and the display unit 12 executing step 380. At this time, the second graphics processing unit 22 receiving the second request command through the TBT interface unit 21 and performing the graphics processing accordingly to generate the second video stream signal, and converting the second video stream signal into the TBT signal, sending the TBT signal to the host device 10 via the TBT interface unit 21, and the display unit 12 displaying the image frame corresponding to the TBT signal.

On the contrary, when determining exceeding the current carrying capacity threshold, performing step 340, the central processing unit redistributing the second request command and the first request command. The allocated first request command driving the first graphics processing unit 11 to perform the compensated graphics processing tasks, and the allocated second request command driving the second graphics processing unit 22 to perform the energy efficiency upper limit of the graphics processing; then performing step 350, the first graphics processing unit 11 receiving the allocated first request command and performing the graphics processing accordingly to generate the first video stream signal; performing step 360 simultaneously, the second graphics processing unit 22 receiving the allocated second request command and performing the graphics processing accordingly to generate the TBT signal corresponding to the second video stream signal.

Then, performing step 370, the central processing unit 13 integrating the TBT signal and the first video stream signal through the graphics driver to obtain the third video stream signal, the graphics driver driving the display unit 12 to receive the third video stream signal, and the display unit 12 executing step 380: the display module 121 displaying the image frame corresponding to the video stream signal computed in sum (i.e. the third video stream signal).

Therefore, when it is determined in advance that the second amount of computation does not exceed the load-carrying capacity threshold, the display unit 12 alone displays only the image frame corresponding to the second video stream signal (in the form of the TBT signal) of the second graphics processing unit 22 in the external graphics device 20. When it is determined in advance that the second amount of computation exceeds the load-carrying capacity threshold, the display unit 12 can display the image frame corresponding to the video stream signal obtained after computing the first video stream signal and the TBT signal in sum. The external graphics system 1 and the external graphics method of the present invention can simultaneously exert the graphics-drawing computing capability and the graphics computing capability of the first graphics processing unit 11 in the host device 10 and the second graphics processing unit 22 in the external graphics device 20. The host device 10 does not omit the graphics-drawing computing capability and the graphics computing capability of the first graphics processing unit 11 just because the external graphics device 20 is connected. An overall graphics processing capability of the external graphics system 1 can be significantly improved.

It is to be understood that the above description of the preferred embodiments of the present invention is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An external graphics system, characterized in that: including:
a host device at least having a first graphics processing unit and a central processing unit, and an external graphics device connected to the host device, the central processing unit issuing a first request command and/or a second request command to execute a graphics processing; the first graphics processing unit receiving the first request command sent by the central processing unit to perform the graphics processing accordingly to generate a first video stream signal; the external graphics device at least including:
a Thunderbolt (TBT) interface unit electrically connected to the host device; and
a second graphics processing unit electrically connected to the TBT interface unit, receiving the second request command sent by the central processing unit through the TBT interface unit, performing the graphics processing accordingly to generate a second video stream signal, converting the second video stream signal into a TBT signal, and transmitting the TBT signal to the host device through the TBT interface unit;
wherein the central processing unit determines whether the graphics processing of the second graphics processing unit exceeds a load-carrying capacity threshold based on the second request command, when the graphics processing of the second graphics processing unit does not exceed the load-carrying capacity threshold, the host device displays an image frame corresponding to the TBT signal; when the graphics processing of the second graphics processing unit exceeds the load-carrying capacity threshold, the central processing unit redistributes the second request command and the first request command, and integrates the TBT signal and the first video stream signal to obtain a third video stream signal, and the host device displays an image frame corresponding to the third video stream signal;
wherein the first video stream signal integrated with the third video stream signal is formed by the first graphics processing unit performing the graphics processing on a video traffic that exceeds the load-carrying capacity threshold.

2. The external graphics system as claimed in claim 1, wherein the host device further includes a display unit, the display unit includes a receiving module, and the receiving module receives the first video stream signal, and/or the TBT signal, or the third video stream signal.

3. The external graphics system as claimed in claim 1, wherein the load-carrying capacity threshold is an energy efficiency upper limit value of the graphics processing performed by the second graphics processing unit.

4. The external graphics system as claimed in claim 1, wherein the host device further includes a host-end interface unit, and the TBT interface unit is electrically connected to the host-end interface unit of the host device through a TBT transmission line.

5. The external graphics system as claimed in claim 1, wherein the central processing unit is loaded with an operating system, the operating system is at least installed with a graphics driver, and the graphics driver is used to drive the first graphics processing unit and/or the second graphics processing unit.

6. An external graphics method utilizing an external graphics system to enhance graphics performance, the external graphics system including a host device at least having a first graphics processing unit and a central processing unit, and an external graphics device connected to the host device, the external graphics device at least including a second graphics processing unit and a Thunderbolt (TBT) interface unit; the central processing unit being used to issue a first request command to instruct the first graphics processing unit to perform a graphics processing, and/or a second request command to instruct the second graphics processing unit to perform the graphics processing; the external graphics method including:
the central processing unit determining whether the graphics processing of the second graphics processing unit exceeding a load-carrying capacity threshold based on the second request command;
when the graphics processing of the second graphics processing unit not exceeding the load-carrying capacity threshold, the second graphics processing unit receiving the second request command through the TBT interface unit and performing the graphics processing accordingly to generate a second video stream signal, and converting the second video stream signal into a TBT signal, transmitting the TBT signal to the host device through the TBT interface unit, and the host device displaying an image frame corresponding to the TBT signal; and
when the graphics processing of the second graphics processing unit exceeding the load-carrying capacity threshold, the central processing unit redistributing the second request command and the first request command, the first graphics processing unit receiving the allocated first request command and performing the graphics processing accordingly to generate a first video stream signal; the second graphics processing unit receiving the allocated second request command through the TBT interface unit and performing the graphics processing accordingly to generate the TBT signal corresponding to the second video stream signal, the central processing unit integrating the TBT signal and the first video stream signal to obtain a third video stream signal, and the host device displaying an image frame corresponding to the third video stream signal;

wherein when the graphics processing of the second graphics processing unit exceeds the load-carrying capacity threshold, the central processing unit redistributes the first request command based on a video traffic exceeding the load-carrying capacity threshold; the first video stream signal integrated with the third video stream signal is formed by the first graphics processing unit performing the graphics processing according to the video traffic indicated by the first request command.

7. The external graphics method as claimed in claim 6, wherein the host device further includes a display unit, the display unit is used to display the image frame corresponding to the TBT signal and/or the first video stream signal, or to display the image frame corresponding to the third video stream signal.

8. The external graphics method as claimed in claim 6, wherein when the graphics processing of the second graphics processing unit does not exceed the load-carrying capacity threshold, the second graphics processing unit receives the allocated second request command through the TBT interface unit and performs the graphics processing accordingly to generate the TBT signal corresponding to the second video stream signal, and the first graphics processing unit stops operating.

* * * * *